Patented July 6, 1937

2,086,077

UNITED STATES PATENT OFFICE 2,086,077

TREATMENT OF HALOGENATED EPOXIDES

Herbert P. A. Groll, Oakland, and George Hearne, Berkeley, Calif., assignors to Shell Development Company, San Francisco, Calif., a corporation of Delaware No Drawing. Application May 9, 1934, Serial No. 724,756

12 Claims. (Cl. 260—157)

This invention is concerned with a novel process for and products of the treatment of halogenated epoxides. Our process comprises reacting a halogenated epoxide of the type herein specified with water in the presence of an acid or acid acting catalyst at moderately elevated temperatures whereby valuable hydroxy compounds can be obtained.

alkyl, alkoxy, alkenyl, carbocyclic, heterocyclic, aralkyl, aralkoxy and/or other suitable organic radicals which may or may not be further substituted as well as other suitable monovalent substituents.

Suitable chlorinated epoxy compounds which may be employed in the execution of our invention include among others compounds such as

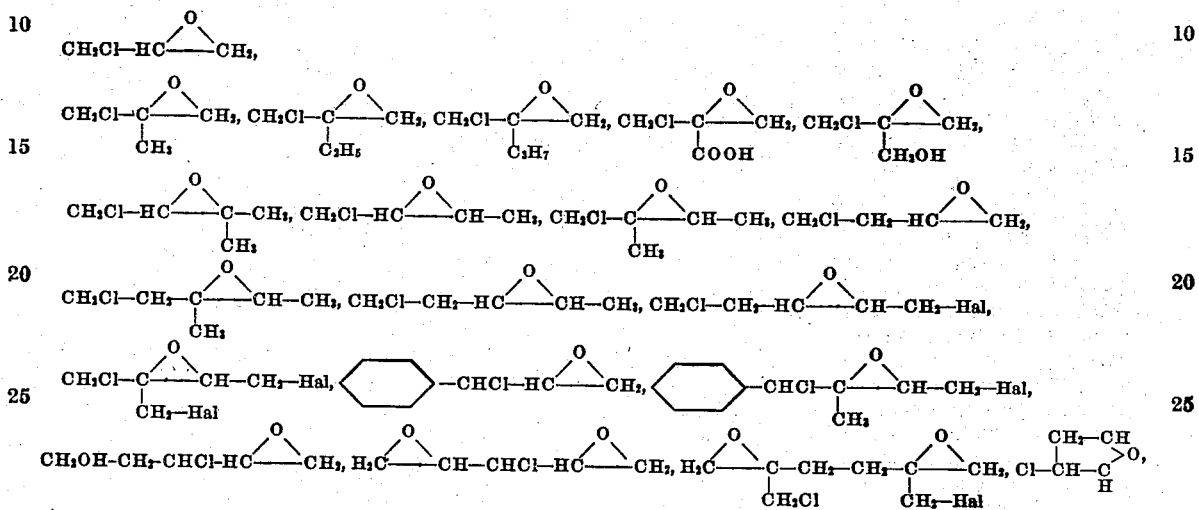

More particularly our invention is concerned with effecting the catalytic hydration of epichlorhydrin and its homologues, analogues and suitable substitution products to useful halogenated polyhydric alcohols.

The halogenated epoxides which are most conveniently prepared, handled and hydrated in acand the like and their homologues, analogues and suitable substitution products.

Another suitable class of halogenated epoxides includes those containing at least one epoxy group wherein at least one epoxy carbon atom is linked directly to a halogen atom. This group of halogenated epoxides includes compounds such as

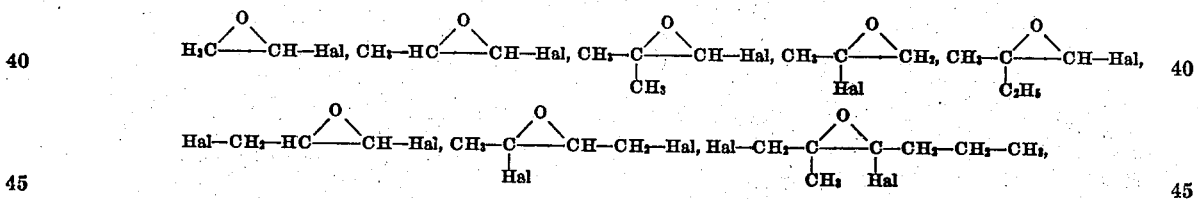

cordance with the principles of our invention, contain at least one epoxy group

and at least one chlorine atom which may or may not be linked to a carbon atom embraced in an epoxy group. The loose bonds of the epoxy group may be taken up by hydrogen, halogen, hydroxyl, and the like and their homologues, analogues and suitable substitution products, whether or not they are open chain compounds or heterocyclic, carbocyclic or aralkyl type derivatives.

We are particularly concerned with the application of our invention to the treatment of those aliphatic chlorinated epoxides containing a tertiary carbon atom embraced in an epoxy group. The epoxides included in this sub-group are readily and substantially completely hydrated to useful products many of which were hitherto unknown.

In executing our invention, we prefer, in the majority of cases, to employ chlorinated epoxides, particularly when the epoxide treated possesses a tertiary epoxy carbon atom. The chlorinated epoxides are in general more readily and cheaply prepared and their treatment results in compounds possessing a greater relative utility than the corresponding bromo or iodo compounds. Brominated and iodated epoxides not possessing a tertiary carbon atom in an epoxy group may be treated by our method and excellent results obtained. Our mode of operation is applicable to any aliphatic halogenated epoxide containing a plurality of epoxy groups and/or a plurality of halogen atoms.

As catalyst for the hydration we may use a suitable acid, acidic salt, acid reacting substance or substance capable of acting as an acid catalyst under the conditions of operations and in contact with the reactants in the reaction medium. Suitable catalysts which may be employed are the strong mineral acids as $H_2SO_4$, $H_3PO_4$, $H_2S_2O_7$, $HPO_3$, $H_3PO_3$, $H_4P_2O_7$, $HClO_4$, $HNO_3$, and the like, or we may employ mineral acid constituents as $SO_2Cl_2$, $SOCl_2$, $SOBr_2$, $NO_2$, $N_2O_3$, $NOCl$, $POCl_3$, $PCl_3$, $PCl_5$, and the like. We may employ suitable inorganic acid acting salts such as $ZnSO_4$, $Zn_3(PO_4)_2$, $Fe_2(SO_4)_3$, $Al_2(SO_4)_3$, $NaHSO_4$, $ZnH_2(SO_4)_2$, $NaH_2PO_4$ and like compounds. We may also employ monobasic organic acids such as formic, acetic, propionic, butyric, isobutyric, valeric, benzoic and their homologues and analogues, or we may employ polybasic acids such as oxalic, malonic, succinic and the like, or hydroxyl and/or carbonyl substituted acids such as lactic, citric, malic, mesoxalic and the like or we may employ organic esters, salts and compounds capable of acting as acid catalysts under the conditions of operation such as benzene sulphonic acid and its homologues and analogous, dialkyl and alkyl acid sulphates, alkylated phosphoric and sulphonic acids, halogenated organic acids, acids such as sulpho-acetic, etc., acid halides and compounds such as aniline-hydrochloride and the like. The catalytic power of the catalyst is dependent on its acid strength and on the temperature of operation of the invention. The weaker the acidity of the catalyst employed, the lower is its catalytic power. Accordingly, all other conditions being the same, the use of a weaker acid catalyst ordinarily requires its application in higher concentrations or operation under higher temperatures in order to obtain the same degree of catalytic activity. When our invention is executed with halogenated epoxides wherein neither of the carbon atoms in an epoxy group is tertiary, we prefer to use the strong mineral acid catalysts. We prefer to effect the hydrolysis of chlorinated epoxy compounds containing a tertiary carbon atom contained in an epoxy group by employing a carboxylic acid or an acid reacting salt as a catalyst. The choice of the particular catalyst to be employed is determined by the particular reactant employed and by the choice of the method to be employed in recovering the reaction product.

When the halogenated epoxide treated by our method does not possess a halogen atom linked directly to a carbon atom embraced in an epoxy group, the main reaction product is a halogenated polyhydroxy alcohol. In general, when the halogenated epoxide contains only one epoxy group, which is not linked to a carbinol group or separated from a carbinol group by one or more tertiary carbon atoms, the main reaction product is a halogenated glycol or a halogenated hydroxy substituted glycol. Those chlorinated epoxides containing a tertiary carbon atom in an epoxy group yield reaction product possessing a tertiary carbinol group.

Halogenated epoxides containing a halogen atom linked directly to an epoxy carbon atom yield hydroxy-carbonylic compounds which may be considered as aldols or ketols depending on whether the halogen atom is attached, respectively, to a primary or secondary epoxy carbon atom. The hydroxy-carbonylic compounds obtained by our method are characterized by possessing a carbonyl group and a hydroxyl group linked to adjacent carbon atoms.

Our invention may be executed in a wide variety of manners depending on the specific halogenated epoxides to be treated, on the particular catalyst employed and on the particular operating conditions chosen. In accordance with a preferred mode of operation, we proceed by contacting the halogenated epoxide with a substantial excess of an aqueous solution or suspension of an acid or acid acting catalyst. The conversion to the desired hydroxy compound is usually effected at moderately elevated temperatures and atmospheric or slightly superatmospheric pressures. The reactants are introduced into a suitable reaction vessel preferably equipped with means for effecting agitation of the reaction mass. The order of introduction of the reactants to the reaction vessel may be varied to suit the particular taste of the operator. The catalyst may be dissolved or suspended in the water before, during or after the introduction of the latter into the reaction vessel.

We prefer to execute our invention in a temperature range of from about 25° C. to 100° C. Higher temperatures and shorter times of contact of the reactants may be resorted to when it is desirable to accelerate the reaction. Usually at temperatures substantially above 100° C. the yield of the desired product is decreased due to the fact that the reaction products, particularly the halogenated alcohols, may be converted to carbonylic compounds under the conditions of the hydration reaction.

Halogenated epoxides containing a tertiary carbon atom in an epoxy group are, in the majority of cases, more readily and easily hydrated at relatively lower temperatures than the corresponding straight chain compounds.

Our process may be executed, in many cases, by refluxing the reaction mixture at its boiling temperature under atmospheric pressures. When it is desired to operate at temperatures above the boiling temperature of the reaction mixture, we may resort to the use of superatmospheric pressures.

Since we prefer to execute our invention employing an excess of water over the epoxide applied, the reaction products are usually obtained in a solution or mixture with varying amounts of water. In the case that recovery of the anhydrous product is desired, the water may be separated by any suitable means such as stratification, distillation, extraction, use of drying agents, etc. The choice of the specific method of recovery will be dependent on the nature of the product or products to be recovered. The halogenated polyhydroxy compounds are preferably recovered by evaporating the water from the slightly acidic reaction mixture at a subatmospheric pressure. In order to obviate the occurrence of undesirable side reactions, it is desirable to employ a catalyst that will not interfere with the selected method of recovery to be employed. When desirable, we may use acids such as isobutyric which will distill as azeotropic mixtures with water and thus be removed from the reaction mixture. The acid acting catalyst in the reaction mixture may be neutralized by the addition of an equivalent amount of a suitable basic substance prior to distillation of the mixture. We have found that the halogenated polyhydroxy compounds obtained by our method are readily hydrolized in even relatively weak alkaline reacting solutions. Sufficient stability to permit distillation of the reaction mixture at subatmospheric pressures is usually ensured by keeping the distilled mixture slightly acidic. In the presence of higher acid concentrations, undesirable side reactions are favored.

The aldols and ketols obtained by our method are preferably recovered as follows: the cooled reaction mixture is neutralized and extracted with a suitable solvent such as ethyl ether, benzene, etc. The extraction solution is separated from the aqueous liquid phase and fractionated whereby separation of the reaction product is effected.

The following examples are introduced for the purpose of illustrating the mode and conditions of execution of our invention when certain specific halogenated epoxides are treated.

Example I

A mixture of 316 gm. of methyl epichlorhydrin $$CH_2Cl-C\underset{CH_3}{\overset{O}{\diagdown}}CH_2$$

and 200 gm. of water was rapidly stirred and heated at its boiling temperature for about 30 min. At the end of this time there was no apparent reaction. About 5 c. c. of 2.5 normal $H_2SO_4$ solution was added to the mixture. The sulphuric acid caused the reaction to start and rapidly proceed to completion. The experiment was terminated when the reaction was complete as evidenced by the disappearance of the upper layer of methyl epichlorhydrin to form the water soluble methyl glycerine monochlorhydrin of the formula $$CH_2Cl-\underset{CH_3}{\overset{}{C}}OH-CH_2OH.$$

The catalyst present in the reacted mixture was neutralized by the addition of an equivalent quantity of sodium hydroxide. The neutral reaction mixture was distilled under a reduced pressure. The water was first distilled from the aqueous solution. The product (methyl glycerine monochlorhydrin) boiled at about 80° C. under a pressure of about 1.6 mm. of mercury. The product was obtained in a yield of about 85%.

Example II

About 200 gm. (1.88 mols) of methyl epichlorhydrin, 54 gm. (3.0 mols) of water and about 2.5 gm. of isobutyric acid were mixed and heated at a temperature of about 90° C. to 100° C. for about one hour.

The reaction mixture was distilled under reduced pressure without resorting to neutralization of the isobutyric acid employed as catalyst. Methyl glycerine monochlorhydrin was obtained in a yield of about 83%.

Example III

About 185 gm. of epichlorhydrin, 150 gm. of water and 10 c. c. of a 0.1 normal $H_2SO_4$ solution were stirred together and heated at about 90° C. to 100° C. for about one hour. At the end of this time the reacted mixture was cooled and neutralized by the addition of an amount of sodium hydroxide equivalent to the acid catalyst employed. The neutral reaction mixture was distilled under a reduced pressure.

Glycerine monochlorhydrin was obtained in a yield of about 90%.

Example IV

About 140 gm. of dichlorisobutylene oxide $$CH_2Cl-\underset{CH_2Cl}{\overset{O}{\underset{|}{C}\diagdown}}CH_2$$

and about 50 gm. of water were stirred together and a few drops of concentrated phosphoric acid were added to the mixture at room temperature. The reaction started with the evolution of heat and after about 25 minutes it appeared to be complete. The reaction mixture was distilled and water removed under a reduced pressure.

The residue amounting to about 155 gm. was identified as dichloro isobutylene glycol having the probable formula $$CH_2Cl-\underset{CH_2Cl}{\overset{}{C}}OH-CH_2OH.$$

Example V

About 246 gm. of bromo ethylene oxide $$H_2C\underset{}{\overset{O}{\diagdown}}\underset{Br}{\overset{}{CH}}$$

were mixed with 180 gm. of water and the mixture charged to an autoclave. The mixture was agitated and 1 gm. of $H_3PO_4$ added. The mixture was heated at 95° C. to 100° C. under the existing pressure for about 30 minutes.

The reaction mixture was cooled, neutralized and distilled under a sub-atmospheric pressure.

The reaction product was the hydroxy acetaldehyde of the formula $CH_2OH-CHO$.

Example VI 203.5 gm. of 1, 3, 5-trichloro-2-methyl-2, 3-epoxypentane $$CH_2Cl-\underset{CH_3}{\overset{O}{\underset{|}{C}\diagdown}}CHCl-CH_2-CH_2Cl,$$

200 gm. of water and 2 gm. of zinc sulphate were placed in a reaction vessel and stirred and heated at about 100° C. for about one hour.

The reaction mixture was cooled, discharged from the reaction vessel and neutralized by the addition of an amount of NaOH equivalent to the acid salt catalyst initially applied and the HCl liberated during the reaction. The neutralized mixture was extracted with ethyl ether and the ether solution was separated, dried and distilled.

The reaction product was identified as 1, 5-dichloro-2 hydroxy-2 methyl-pentanone-2

$$CH_2Cl-\underset{CH_3}{\overset{}{C}}OH-CO-CH_2-CH_2Cl$$

The product was obtained in a yield of about 80%.

It will be apparent to those skilled in the art to which our invention pertains, that our invention may be executed in a batch, intermittent or continuous manner. In a preferred batch mode of operation, the halogenated epoxide and aqueous acid or acid acting catalyst solution may be contacted before or during their admittance to the reaction vessel. The reaction mixture may be agitated and refluxed at its boiling temperature until the reaction is substantially complete. The reacted mixture which may comprise the reaction product, unreacted halogenated epoxide, water and acid or acid acting catalyst as well as hydrogen halide in some cases, may be used without resorting to separation of the constituents for solvent, extraction and the like purposes or may be used in the preparation of glycerols, ethers, esters, carbonylic compounds, carboxylic acids, resins and the like or the constituents may be separated by any suitable means. The unreacted halogenated epoxide may be recovered and conducted back to the reaction vessel for reutilization therein.

Mixed halogenated epoxides can be reacted without resorting to separation of the different species or types of epoxides and mixed reaction products obtained. These mixtures may be utilized as such or separation of the products effected by some suitable means as fractionation or selective extraction.

In a continuous mode of operation, we may use a tubular reaction vessel made of pipes connected in series or multiple through which the reaction mixture is caused to flow at the desired rate. The reaction mixture may be kept in a state of turbulence by causing it to pass over or through suitable baffles or orifice plates placed at suitable intervals throughout the lengths of the tubes. The tubular reaction vessel may be divided into two main parts. The first of these parts is placed into a suitable heating medium such as a furnace, steam jacket, heating coil or the like which serves to raise the temperature of reaction mixture to the point at which the reaction is initiated and/or maintained. The second main part of the reactor which is placed outside of the heating medium is so arranged that the reacted mass leaving the heated portion of the reactor is cooled by a suitable heat exchange device and discharged from the system. The discharged liquid which may or may not contain unreacted halogenated epoxide may be conducted to a communicating purification or recovery stage wherein the reaction product is recovered by some suitable means. The reactants and catalyst may be admitted to the reaction vessel intermittently or continuously either independently or in solution, mixture or suspension with each other.

The halogenated polyhydroxy compounds prepared by our process may be used for numerous solvent and extraction purposes. They may be used as raw materials in the preparation of glycols, glycerols, esters, ethers, carboxylic acids and the like compounds as well as for the production of valuable carbonylic compounds. The hydroxy-carbonylic compounds may be used as raw materials in the production of resins and condensation products as well as for solvent and extraction purposes.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for the conversion of halogenated epoxides to valuable hydroxy compounds which comprises reacting a halogenated epoxide containing a tertiary carbon atom embraced in an epoxy group and wherein a carbon atom embraced in an epoxy group is linked directly to a halogen atom with water in the presence of a carboxylic acid.

2. A process for the conversion of halogenated epoxides to valuable hydroxy compounds which comprises reacting a polyhalogenated aliphatic epoxide containing a tertiary carbon atom embraced in the epoxy group with water in the presence of a carboxylic acid.

3. A process for the conversion of halogenated epoxides to valuable hydroxy compounds which comprises reacting a halogenated epoxide possessing a plurality of halogen atoms and a plurality of epoxy groups at least one of which embraces a tertiary carbon atom with water in the presence of a carboxylic acid.

4. A process for the conversion of halogenated epoxides to valuable hydroxy compounds which comprises reacting a chlorinated aliphatic epoxide possessing a tertiary carbon embraced in an epoxy group with water in the presence of a carboxylic acid.

5. A process for the conversion of halogenated epoxides to valuable hydroxy compounds which comprises reacting a halogenated epoxide possessing a tertiary carbon atom embraced in an epoxy structure with water in the presence of a carboxylic acid.

6. A process for the conversion of methyl epichlorhydrin to methyl glycerine monochlorhydrin which comprises reacting methyl epichlorhydrin with water in the presence of an acid acting catalyst.

7. As a novel compound: the halogenated polyhydric alcohol of the general formula

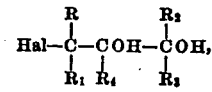

wherein R and $R_1$ are substituents of the group consisting of hydrogen atoms, halogen atoms and hydrocarbon radicals, $R_2$ and $R_3$ are substituents of the group consisting of hydrogen atoms and hydrocarbon radicals, $R_4$ is a hydrocarbon radical, and Hal is a halogen atom.

8. As a novel compound: the monohalogenated polyhydric alcohol of the general formula

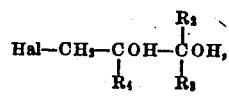

wherein $R_2$ and $R_3$ are substituents of the group consisting of hydrogen atoms and hydrocarbon radicals, $R_4$ is a hydrocarbon radical, and Hal is a halogen atom.

9. As a novel compound: the monochlorinated polyhydric alcohol of the general formula

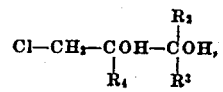

wherein $R_2$ and $R_3$ are substituents of the group consisting of hydrogen atoms and hydrocarbon radicals, and R4 is a hydrocarbon radical.

10. As a novel compound: the halogenated polyhydric alcohol of the formula

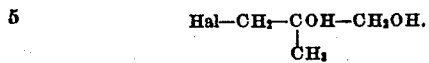

11. A process for the conversion of a halogenated epoxide of the general formula

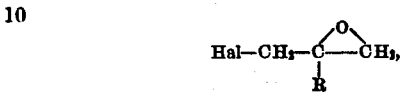

wherein R represents a radical of the group consisting of the methyl radical and halogen substituted methyl radicals, to the corresponding glycerine halohydrin which comprises reacting the halogenated epoxide with water in the presence of an acid-acting catalyst.

12. A process for the conversion of a methyl epihalohydrin to the corresponding methyl glycerine monohalohydrin which comprises reacting the methyl epihalohydrin with water in the presence of an acid-acting catalyst.

HERBERT P. A. GROLL.
GEORGE HEARNE.